(12) United States Patent
Pritchard et al.

(10) Patent No.: US 6,354,173 B1
(45) Date of Patent: Mar. 12, 2002

(54) TRANSFER CASE WITH CIRCUMFERENTIAL MOUNT TO TRANSMISSION

(75) Inventors: Larry A. Pritchard, Macomb; John R. Forsyth, Romeo, both of MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 09/510,633

(22) Filed: Feb. 22, 2000

(51) Int. Cl.⁷ ............................................. F16H 57/02
(52) U.S. Cl. ...................... 74/606 R; 475/206; 180/248
(58) Field of Search ...................... 74/606 R; 475/206, 475/204, 208; 180/248

(56) References Cited

U.S. PATENT DOCUMENTS

| 5,566,591 A | * | 10/1996 | Burkett ...................... 74/606 R |
| 5,762,578 A | * | 6/1998 | Forsyth ...................... 475/198 |
| 5,885,182 A | * | 3/1999 | Forsyth ...................... 475/198 |
| 5,890,986 A | * | 4/1999 | Pritchard et al. ........... 475/206 |
| 5,924,952 A | | 7/1999 | Bowen |
| 6,022,289 A | | 2/2000 | Francis |
| 6,053,072 A | | 4/2000 | Schleuder |

FOREIGN PATENT DOCUMENTS

| JP | 5-33847 | * | 10/1987 | ............... 74/606 R |
| JP | 62-233564 | * | 10/1987 | ............... 74/606 R |

* cited by examiner

*Primary Examiner*—Vinh T. Luong
(74) *Attorney, Agent, or Firm*—Harness, Dickey & Pierce, P.L.C.

(57) ABSTRACT

A powertrain assembly includes a first housing defining a first longitudinal axis. The first housing also has an axially extending pilot. The powertrain assembly further includes a second housing defining a second longitudinal axis and an outer wall. The outer wall has a guide face formed on an inner surface. The pilot is disposed within the second housing and engages the guide face to align the first and second longitudinal axes. A fastener interconnects the second housing on the first housing.

16 Claims, 2 Drawing Sheets

TRANSFER CASE WITH CIRCUMFERENTIAL MOUNT TO TRANSMISSION

BACKGROUND OF THE INVENTION

1. Technical Field

The present invention generally relates to motor vehicles and, more particularly, to the connection between powertrain components of the motor vehicle. More specifically, but without restriction to the particular embodiment and/or use which is shown and described for purposes of illustration, the present invention relates to a transfer case with a piloted socket-type mount to a transmission.

2. Discussion

As is known, motor vehicles include a drivetrain comprised of a power generating unit (the engine) and one or more power transmission devices (i.e., transmission, transfer case, axle assemblies, torque couplings, etc.) which are operably interconnected to transfer drive torque to the driven wheels. In the case of four-wheel drive vehicles, one such interconnection occurs between the transmission and the transfer case. Generally, the transmission and the transfer case each include a housing having a flange or end plate extending radially therefrom. As is conventional, each flange includes a plurality of longitudinal apertures. When the housings of the transmission and transfer case are to be interconnected, planar mounting surfaces on the radial flanges are positioned adjacent to one another and the apertures are aligned. Standard fasteners, such as threaded bolts, are installed in the aligned mounting apertures to clamp the radial flanges together, thereby rigidly mounting the transfer case to the transmission.

While a conventional flange mount system for interconnecting the housings of power transmission assemblies have been used successfully, opportunities for improvement still exist. For example, conventional flush-mounted flange connections do not lend themselves to a piloted alignment system. Specifically, radial flange joints typically do not include geometrical features such as pilots or keyways to assist in the alignment of the power transfer devices. Furthermore, joint stiffness is a design factor associated with the use of radial mounting flanges. Heavy power transmission assemblies, such as automatic transmissions and transfer cases, often transfer a bending movement to the flange joint connection. To accommodate such bending movements with only limited acceptable flexure of the joint connection, the radial flanges and portions of the housing adjacent the flanges must be thickened to provide the required joint stiffness and strength. Additionally, because the fasteners are parallel to the transmission centerline in the conventional flange mount system, access to the fastener is often limited and sometimes results in the assembly being lengthened to allow fastener assembly clearance and wrench clearance thereby reducing overall powertrain stiffness. Placing the fasteners perpendicular to the transmission centerline eliminates this problem.

SUMMARY OF THE INVENTION

Accordingly, the present invention is directed to overcoming the disadvantages commonly associated with the use of conventional radial flange joints to interconnect a pair of power transfer devices in the drivetrain of a motor vehicle. Therefore, it is an object of the present invention to provide a piloted or socket-type connection between a pair of power transmission devices.

A more particular object of the present invention is to provide a piloted socket-type mount connection between a transfer case and a transmission.

In accordance with the present invention, a socket-type connection is made between the housings of first and second power transmission assemblies. In particular, a first housing has an axial extending pilot flange that is adapted for retention within a receptor flange extending from a second housing. The pilot flange has an outer wall surface adapted to matingly engage an inner wall surface of the receptor flange. Alignment apertures in the receptor flange are alignable with mounting bores in the pilot flange so as to permit the use of threaded fasteners for securing the receptor flange on the pilot flange.

As an additional feature, the socket-type connection can include an axial keyway formed in one of the pilot and receptor flanges which is adapted to receive a complimentary keylug formed in the other of the flanges.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

In general, the present invention is directed to a powertrain assembly of the type typically used in motor vehicles. More particularly, the present invention is directed to a socket-type mount for interconnecting power transmission assemblies.

Figure 1:
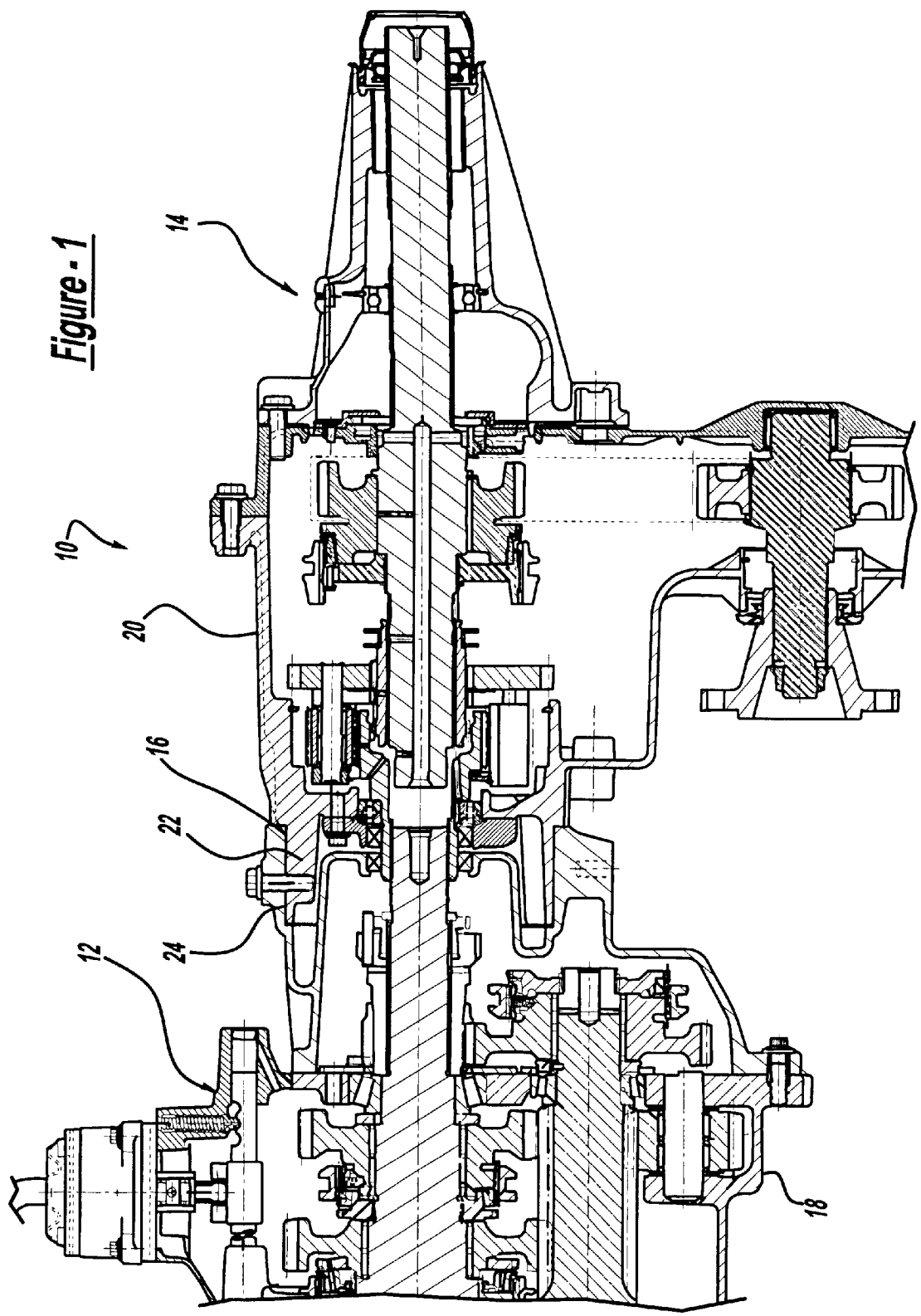
FIG. 1 is a partial sectional view of a transmission mounted to a transfer case in accordance with the teachings of the preferred embodiment of the present invention.

With initial reference to FIG. 1, an exemplary powertrain assembly 10 is shown which embodies the teachings of a preferred embodiment of the present invention. Powertrain 10 includes a multi-speed transmission 12 and a transfer case 14 which are used in the driveline of a motor vehicle in a conventional manner. In the particular application illustrated, a socket-type mount 16 is used to interconnect a transmission housing 18 to a transfer case housing 20 utilizing the axial piloting system of the present invention. One skilled in the art will appreciate that the structure of transmission 12 and transfer case 14 are merely exemplary and that other power transmission devices may be interconnected using the piloted mounting arrangement of the present invention.

Figure 2:
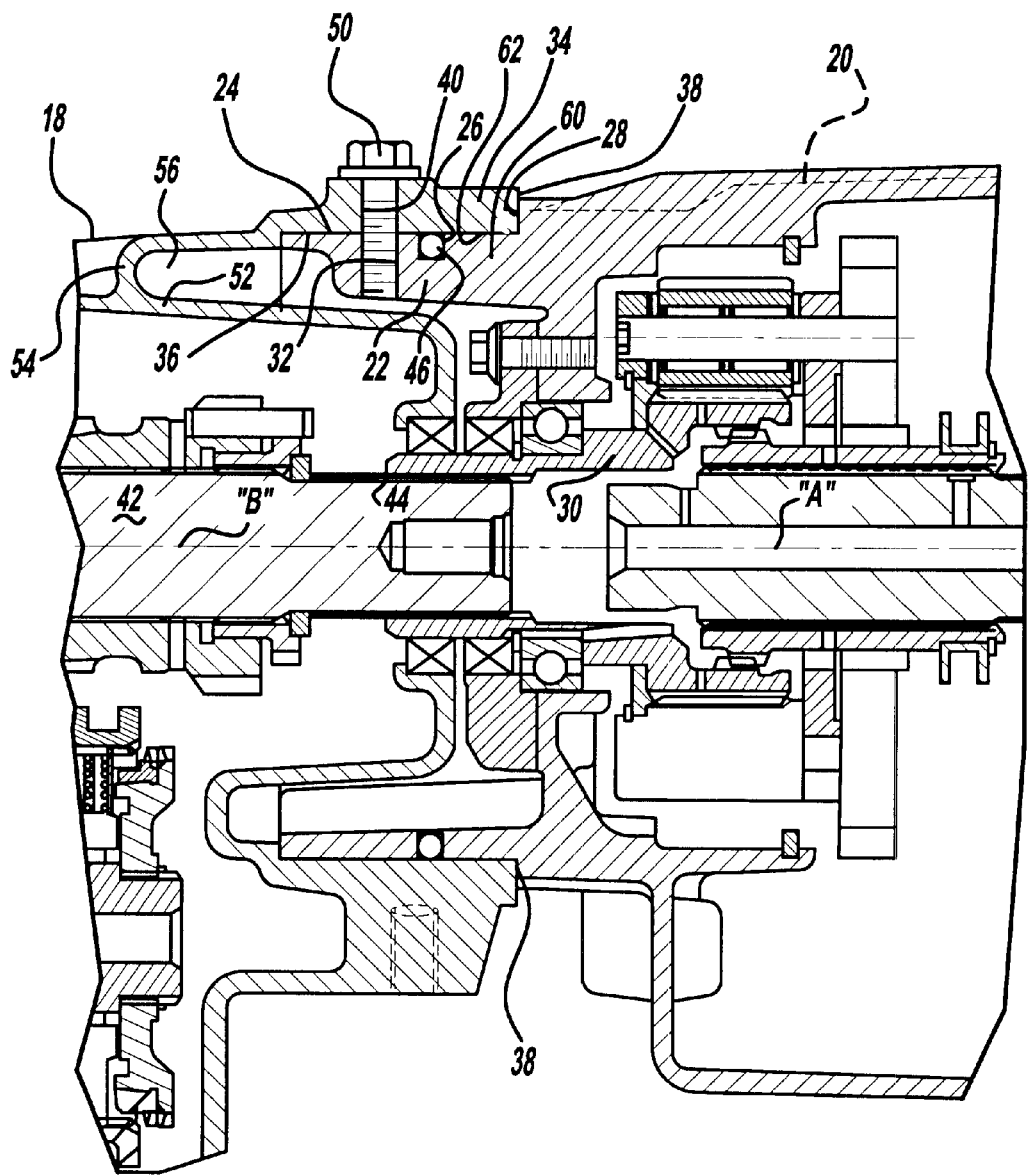
FIG. 2 is an enlarged partial view of FIG. 1 showing the pilot mount between the transmission housing and the transfer case housing in greater detail.

With continued reference to FIG. 1 and as shown in greater detail in FIG. 2, transfer case housing 20 is generally conventional with the exception that its input end is formed to include an axial pilot flange 22 having an outer surface 24, a seal groove 26 formed in outer surface 24, and a radial step surface 28. Preferably, outer surface 24 is cylindrical so as to be concentric with respect to the rotary axis "A" of input shaft 30. In addition, a series of radial mounting bores 32 extend through pilot flange 22 and are preferably arranged circumferentially in an equally-spaced orientation. Preferably, mounting bores 32 are threaded.

Transmission housing 18 is also generally conventional with the exception that its output end is formed to include a receptor flange 34 having an inner surface 36, an end surface 38, and alignment apertures 40. Preferably, inner surface 36 is cylindrical so as to be concentric with respect to the rotary axis "B" of transmission output shaft 42. Accordingly, upon splined engagement 44 of output shaft 42 with input shaft 30, outer surface 24 of pilot flange 22 mates with inner surface 36 of receptor flange 34. A suitable seal, such an O-ring 46 is retained in groove 26 to provide a fluid-tight continuous seal between outer surface 24 of pilot flange 22 and inner surface 36 of receptor flange 34. As seen, end surface 38 of receptor flange 34 is adapted to matingly engage radial step surface 28 of pilot flange 22 such that radial step surface 28 serves as a stop. Once alignment apertures 40 are aligned with corresponding mounting bores 32, threaded bolts 50 are installed therein to rigidly secure receptor flange 34 on pilot flange 22.

To provide means for limiting the axial length of the above-noted socket-type mount 16, receptor flange 34 surrounds a portion of an outer wall 52 of transmission housing 18 and is connected thereto via a transition wall 54. Thus, pilot flange 22 is adapted to be inserted into an annular chamber 56 defined between outer wall 52 and receptor flange 34. According to another feature of the present invention, outer surface 24 of pilot flange 22 and inner surface 36 of receptor flange 34 can be tapered to define a frusto-conical morse-type self-locking interface therebetween. Such an arrangement will provide a connection which is resistant to axial pull-apart and torsional loads. Also, it is contemplated that an opposite socket-type joint could be provided with a pilot flange associated with the transmission housing that is adapted for insertion into a receptor flange formed on the transfer case housing, if such an alternative mounting structure is preferred. Additionally, this socket-type mounting arrangement is contemplated for use between any two driveline components of a motor vehicle which historically have been connected using traditional flush-mount arrangements, and is not limited to the transmission/transfer case interface shown.

As further shown in FIG. 2, an axial keylug 60 is formed on outer surface 24 of pilot flange 22 which is seated in a similarly-sized keyway 62 formed in inner surface 36 of receptor flange 34. Such a keyed alignment system facilitates automated assembly while assisting in resisting torsional loading between flanges 22 and 34. Additionally, conventional dowels can also be used at the end surface 38 and radial step surface 28 interface to align the parts and resist torsional loading.

The invention being thus described, it will be obvious that the same may be varied in many ways. Such inventions are not to be regarded as a departure from the spirit and scope of the invention, and all such modifications as would be obvious to one skilled in the art are intended to be included within the scope of the following claims.

What is claimed is:

1. A powertrain housing assembly comprising:
    a first housing defining a first longitudinal axis and having an axially extending pilot flange, said axially extending pilot flange including an outer wall surface and at least one radial mounting bore;
    a second housing defining a second longitudinal axis and having a receptor flange, said receptor flange having an inner wall surface and at least one radial alignment aperture, said inner wall surface adapted to matingly engage said outer wall surface of said axially extending pilot flange; and
    at least one fastener being disposed in said at least one radial mounting bore and said at least one radial alignment aperture such that said receptor flange is rigidly secured on said pilot flange and said first longitudinal axis aligns with said second longitudinal axis.

2. The powertrain housing assembly of claim 1 wherein said inner wall surface of said receptor flange terminates at an end face and wherein said outer wall surface of said pilot flange includes a stop, said stop abutting said end face to limit axial movement between said receptor flange and said pilot flange.

3. The powertrain housing assembly of claim 1 wherein said axially extending pilot flange further includes a retaining groove and a seal disposed therein for providing a fluid-tight seal between said axially extending pilot flange and said receptor flange.

4. The powertrain housing assembly of claim 1 wherein said at least one fastener is radially positioned relative to said first and second longitudinal axes.

5. The powertrain housing assembly of claim 1 wherein said at least one fastener is perpendicularly positioned relative to said first and second longitudinal axes.

6. The powertrain housing assembly of claim 1 wherein said at least one fastener is a threaded bolt.

7. The powertrain housing assembly of claim 1 wherein said receptor flange further includes a keyway formed therein adapted to receive an axial keylug formed on said axially extending pilot flange such that torsional loading between said receptor flange and said pilot flange is resisted.

8. The powertrain housing assembly of claim 1 wherein one of said axially extending pilot flange and said receptor flange further include a keyway formed therein adapted to receive an axial keylug formed on the other of said axially extending pilot flange and said receptor flange such that torsional loading between said pilot flange and said receptor flange is resisted.

9. A drivetrain housing assembly comprising:
    a transfer case housing including an axially extending pilot flange, said axially extending pilot flange having an outer wall surface and at least one radial mounting bores;
    a transmission housing including a receptor flange, said receptor flange having an inner wall surface and at least one radial alignment aperture, said inner wall surface adapted to matingly engage said outer wall surface of said axially extending pilot flange; and
    at least one fastener disposed in said at least one radial mounting bore and said at least one radial alignment aperture for coupling said transfer housing to said transfer case housing.

10. The drivetrain housing assembly of claim 9 wherein said inner wall surface of said receptor flange terminates at an end face and wherein said outer wall surface of said pilot flange includes a stop, said stop abutting said end face to limit axial movement between said receptor flange and said pilot flange.

11. The drivetrain housing assembly of claim 9 wherein said axially extending pilot flange further includes a retaining groove and a seal disposed therein for providing a fluid-tight seal between said axially extending pilot flange and said receptor flange.

12. The drivetrain housing assembly of claim 9 wherein said at least one fastener is radially positioned relative to a transfer case housing longitudinal axis and a transmission housing longitudinal axis.

13. The drivetrain housing assembly of claim 9 wherein said at least one fastener is perpendicularly positioned relative to a transfer case housing longitudinal axis and a transmission housing longitudinal axis.

14. The drivetrain housing assembly of claim 9 wherein said at least one fastener is a threaded bolt.

15. The drivetrain housing assembly of claim 9 wherein said receptor flange further includes a keyway formed therein adapted to receive an axial keylug formed on said axially extending pilot flange such that torsional loading between said receptor flange and said pilot flange is resisted.

16. The drivetrain housing assembly of claim 9 wherein one of said axially extending pilot flange and said receptor flange further include a keyway formed therein adapted to receive an axial keylug formed on the other of said axially extending pilot flange and said receptor flange such that torsional loading between said pilot flange and said receptor flange is resisted.

* * * * *